(No Model.)

G. K. KNOWLTON.
DOUGH KNEADER.

No. 355,767. Patented Jan. 11, 1887.

Witnesses.
E. Planta.
O. M. Shaw.

Inventor.
George K. Knowlton,
Per C. C. Shaw,
Attorney.

UNITED STATES PATENT OFFICE.

GEORGE K. KNOWLTON, OF HAMILTON, MASSACHUSETTS.

DOUGH-KNEADER.

SPECIFICATION forming part of Letters Patent No. 355,767, dated January 11, 1887.

Application filed July 2, 1886. Serial No. 206,901. (No model.)

*To all whom it may concern:*

Be it known that I, GEORGE K. KNOWLTON, of Hamilton, in the county of Essex, State of Massachusetts, have invented a certain new and useful Improvement in Dough-Kneaders, of which the following is a description sufficiently full, clear, and exact to enable any person skilled in the art or science to which said invention appertains to make and use the same, reference being had to the accompanying drawings, forming part of this specification, in which—

Figure 1:
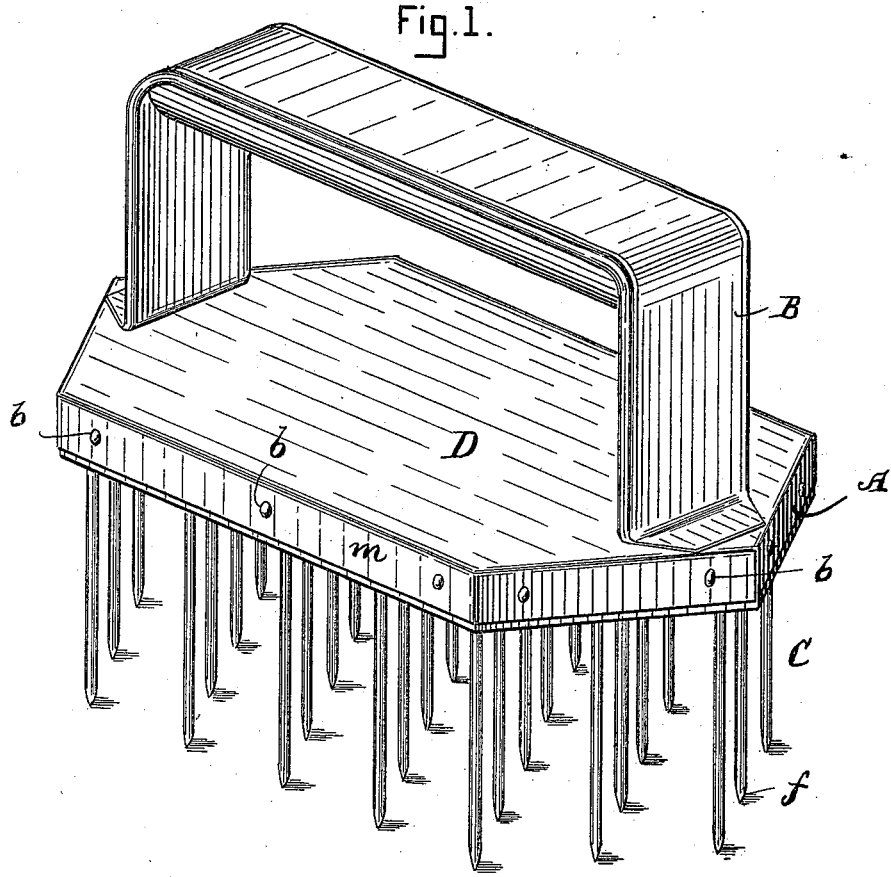
Figure 2:
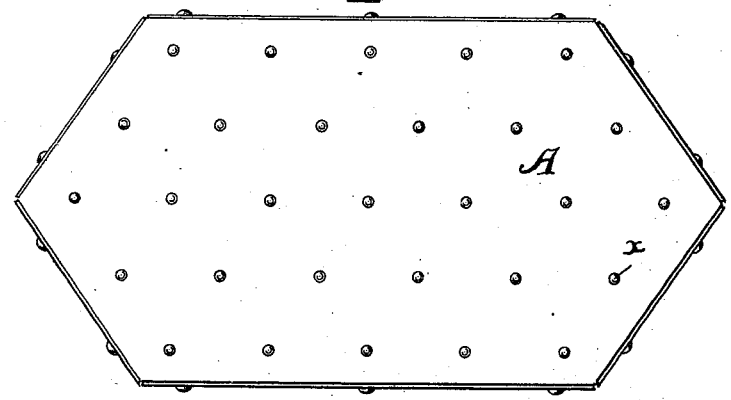

Figure 1 is an isometrical perspective view of my improved dough-kneader, and Fig. 2 a top plan view of the body of the same with the handle and covering removed.

Like letters of reference indicate corresponding parts in the different figures of the drawings.

My invention relates to that class of dough-kneaders which are designed more especially for domestic or family purposes; and it consists in a novel construction and arrangement of parts, as hereinafter more fully set forth and claimed, the object being to produce a simpler, cheaper, and more effective device of this character than is now in ordinary use.

The nature and operation of the improvement will be readily understood by all conversant with such matters from the following explanation:

In the drawings, A represents the body, B the handle, and C the perforators. The body is preferably composed of wood, and may be of any suitable size and form; but for ordinary purposes it may be about six or eight inches in length, three or four in width, and half an inch thick. The perforators each consist of a piece of wire, which is preferably about three inches in length, being pointed at its lower end, as shown at $f$, and provided with a head at its upper end, as shown at $x$.

In constructing the kneader, the body is first bored with a series of holes, preferably arranged at regular intervals, at distances of about one inch from each other, and in rows, as shown in Fig. 2, the perforators being driven into the holes until their heads $x$ rest on the upper side of the body. A cover, D, provided with a downwardly-projecting flange, $m$, and handle B, is then placed over the body and secured thereto by the headed pins $b$, which may be withdrawn to remove the cover when required. The cover may, however, be secured to the body in any other suitable manner, if preferred.

It is well known that one of the principal objects in kneading dough is to bring all parts of the mass into contact with the atmosphere. This, however, cannot be effectively accomplished by many of the ordinary kneaders, as they do not penetrate the mass, and hence afford no means for the air to reach its interior.

My invention is designed to obviate this objection; and to that end I construct the kneader with a series of perforators or puncturing-needles adapted to perforate the mass of dough, and thereby bring all parts of it into contact with the atmosphere.

In the use of my improvement the dough may be placed in any suitable pan or vessel, the kneader being held by the handle B, and its perforating-needles C forced rapidly and repeatedly through the mass, each new thrust closing or partially closing the holes or cells last made and forming new ones, more or less air being confined within the mass at each descent of the perforators. The dough may be made slightly stiffer or thicker than when it is to be kneaded in the ordinary manner, as no flour has to be added to prevent it from sticking to the hands.

I do not confine myself to attaching the handle to the cover D, as it may be attached directly to the body A. Neither do I confine myself to the use of any special form of handle, nor to the use of the cover D.

Meat-tenderers have heretofore been constructed with short needles arranged in close proximity to each other; but such devices are not adapted for use as dough-kneaders, as, owing to the close proximity of the needles, the dough would cling thereto, and the device could not be readily withdrawn from the mass of dough. In my invention the slim elongated needles are disposed at sufficient distances apart to prevent the dough from clinging to them, as the gravity of the considerable mass of dough between the sparse needles is greater than the adhesive force thereof.

Having thus explained my invention, what I claim is—

A dough-kneader comprising a body or plate provided with a series of slim elongated perforating-needles arranged at distances of about one inch from each other, whereby they are adapted to be thrust into the dough and withdrawn therefrom free from adherence of the mass of dough, each successive thrust forming holes or cells for the admission of air and closing those formed by the preceding thrust, substantially as set forth.

GEORGE K. KNOWLTON.

Witnesses:
O. M. SHAW,
E. L. SAWYER.